United States Patent [19]

Tsai et al.

[11] Patent Number: 4,816,056

[45] Date of Patent: Mar. 28, 1989

[54] HEATING AND AGITATING METHOD FOR MULTI-STAGE MELTING AND REFINING OF GLASS

[75] Inventors: Yih-Wan Tsai, Pittsburgh; John E. Sensi, Arnold, both of Pa.

[73] Assignee: PPG Industries, Inc., Pittsburgh, Pa.

[21] Appl. No.: 104,140

[22] Filed: Oct. 2, 1987

[51] Int. Cl.⁴ .............................................. C03B 5/04
[52] U.S. Cl. ....................................... 65/135; 65/136; 65/335
[58] Field of Search ..................... 65/33, 96, 121, 134, 65/135, 136

[56] References Cited

U.S. PATENT DOCUMENTS

| | | | |
|---|---|---|---|
| 3,592,623 | 7/1971 | Shepherd | 65/135 |
| 3,617,234 | 11/1971 | Hawkins et al. | 65/337 |
| 3,746,527 | 7/1973 | Knavish et al. | 65/136 |
| 3,771,988 | 11/1973 | Starr | 65/134 |
| 3,885,945 | 5/1975 | Rees, deceased, et al. | 65/136 |
| 4,381,934 | 5/1983 | Kunkle et al. | 65/135 |
| 4,473,388 | 9/1984 | Lauwers | 65/135 |
| 4,632,690 | 12/1986 | Colwell, Jr. et al. | 65/135 |
| 4,671,765 | 6/1987 | Tsai | 432/13 |

Primary Examiner—Robert L. Lindsay
Attorney, Agent, or Firm—Dennis G. Millman

[57] ABSTRACT

In a method of making glass or the like, wherein the batch materials are liquefied in a distinct zone from the refiner, the liquefied material is heated in an intermediate stage before being fed to the refiner. The heating entails intensified flames that impinge the surface to provide homogenization and a barrier to surface flow of low density material.

7 Claims, 2 Drawing Sheets

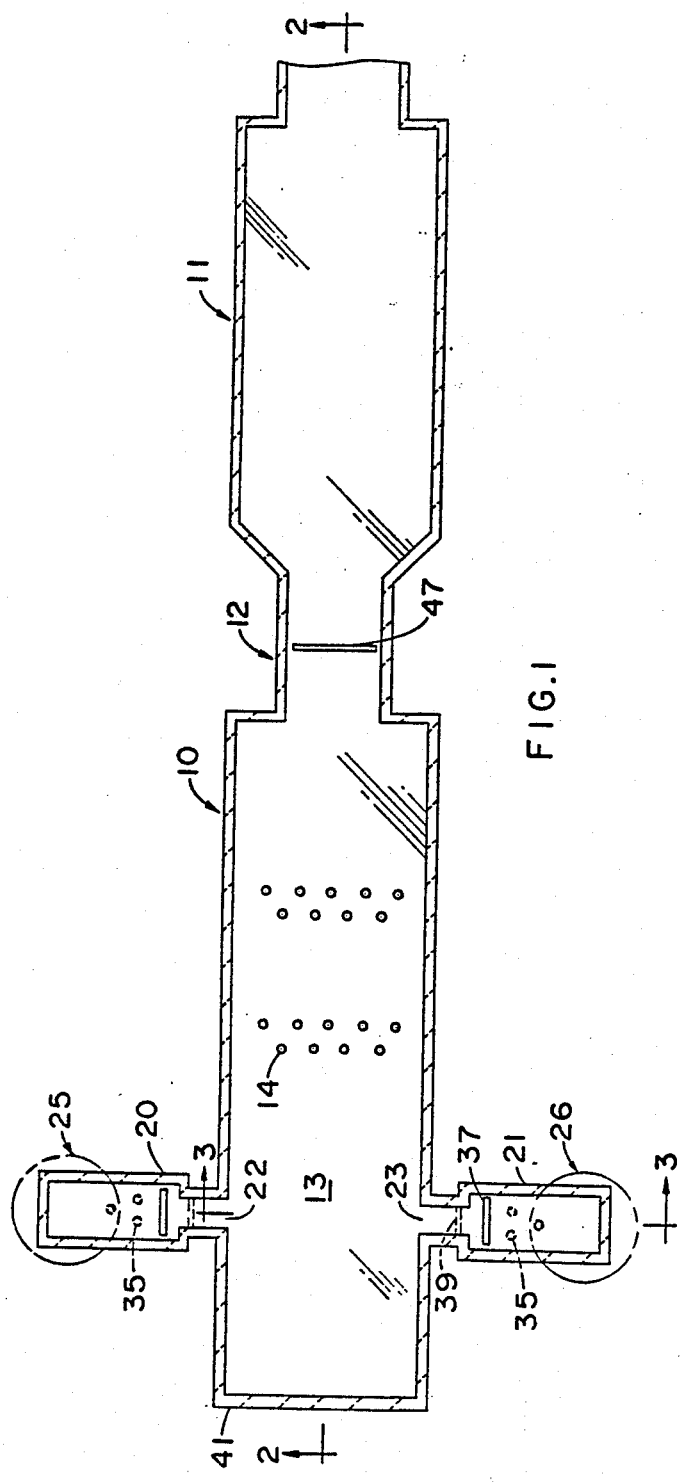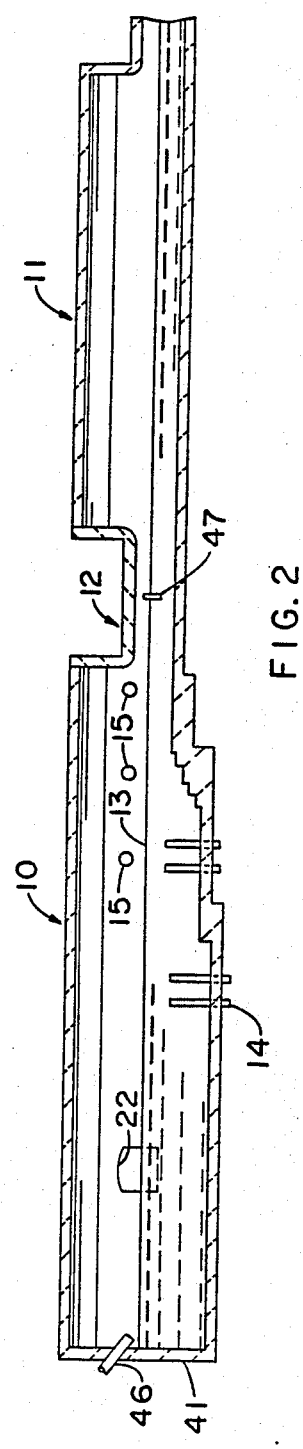

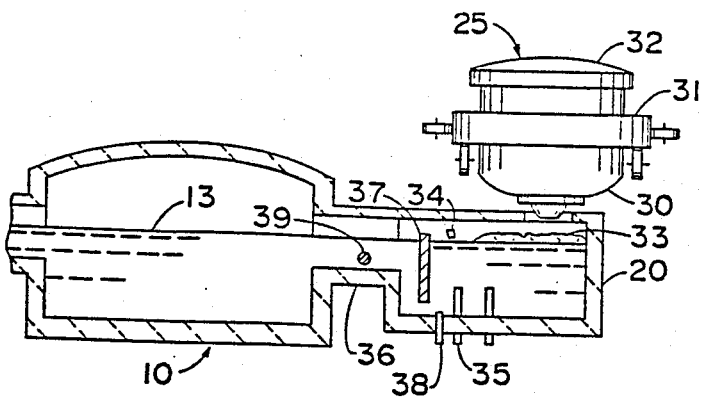
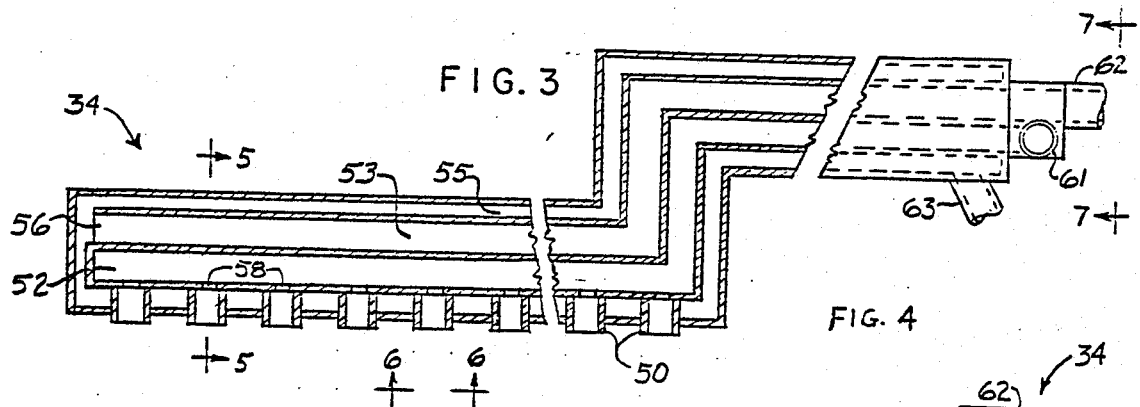
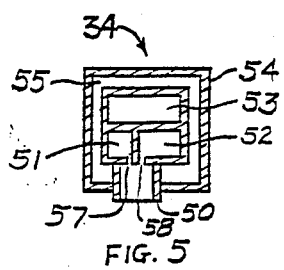
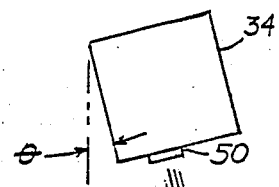
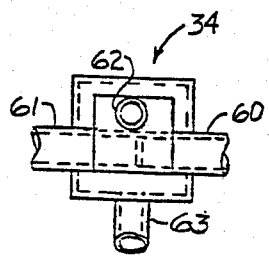
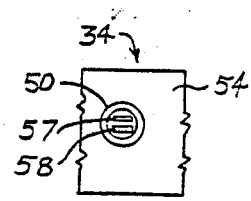
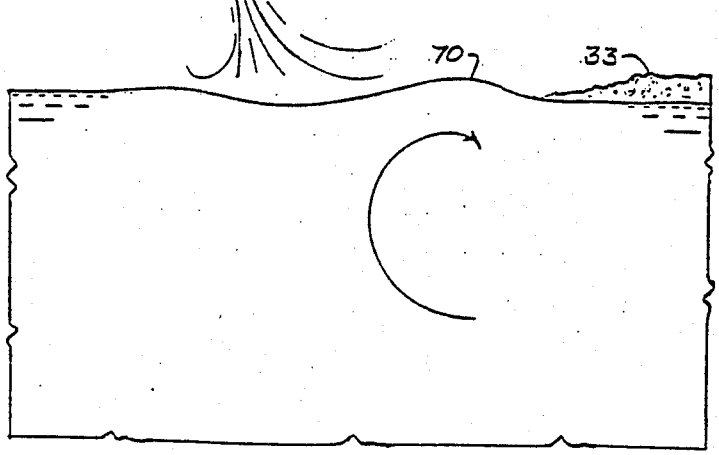

HEATING AND AGITATING METHOD FOR MULTI-STAGE MELTING AND REFINING OF GLASS

BACKGROUND OF THE INVENTION

The present invention relates to a staged process and apparatus for producing glass or the like of the type disclosed in U.S. patent application Ser. No. 914,228 filed on Oct. 2, 1986 abandoned. Although specifically applicable to production of vitreous glass products such as flat glass, fiber glass, container glass, or sodium silicate glass, the invention is also applicable to similar products that may not be considered "glass" under strict definitions. It should be understood that the term "glass" is used herein in the broader sense to include glass-like products. On the other hand, because of the higher standards for optical quality of flat glass, the improvements in refining achieved by the present invention are particularly significant to the production of flat glass.

In U. S. Pat. No. 4,381,934 to Kunkle et al. there is disclosed a process for performing the initial step of the melting process, rendering pulverulent batch minerals to a liquefied, partially melted state. This process requires that the melting process be completed by a subsequent process stage for most glass products. Refining of the liquefied material would be a typical task of the subsequent process stage. In the aforesaid patent, it is disclosed that the refining may be carried out by feeding the liquefied material to a conventional tank-type melting furnace. In order to optimize the economies of construction and operation of such a staged melting and refining operation, it is desirable to carry out the refining in as efficient a manner as possible, thereby minimizing the size of the refining apparatus and the energy consumed therein.

In the melting of glass, substantial quantities of gas are produced as a result of decomposition of batch materials. Other gases are physically entrained by the batch combustion heat sources. Most of the gas escapes during the initial phase of melting, but some becomes entrapped in the melt. A primary objective of refining is to provide sufficient time and temperature conditions for substantial portions of these entrapped gases to be eliminated from the melt. Because elevated temperatures expedite the rise and escape of gaseous inclusions, the highest temperatures of the melting process are typically provided in the refining zone. Additionally, thermal conditions are conventionally controlled in the refining zone to maintain recirculating flows of the molten glass in order to provide adequate residence time and to assure that the throughput stream passes through the region at high temperatures, where gases are released into the space above the melt, and that unrefined portions of the melt are directed away from the throughput stream. Additionally, the refining stage may be employed to assure dissolution of any remaining solid particles of the batch. Furthermore, the recirculation established during refining can be useful in homogenizing the melt. It would be desirable to optimize the achievement of at least some, and preferably all, of these objectives of refining when coupled to a discrete liquefying stage as in U. S. Pat. No. 4,381,934.

A difficulty arises from the fact that material discharged from a liquefying stage is only partially melted, typically being in a substantially foamy conduction with unmelted solid particles. When such material is passed to a pool of molten glass in a refining furnace, the material tends to stratify near the surface of the pool. This stratified material has been found to not respond to the recirculating flows within the main portion of the pool that assure adequate residence time and temperature exposure to accomplish the refining step. Accordingly, discharging material from a liquefying stage directly to a recirculating refining furnace as shown in U.S. Pat. No. 4,381,934 has been found to yield inadequate refining.

Another problem is that maintaining the desired convection flow patterns in the refiner is more difficult when the material entering the refiner is liquefied. This is because in a conventional tank type melting and refining furnace and unmelted batch materials fed onto the molten pool serve as a heat sink at one end of the pool, thereby creating a downward flow in that region which contributes to sustaining a strong circulation pattern. Such an effect is not present to as great an extent when the batch materials are liquefied at a separate location. When there is insufficient recirculation in the refiner, the probability increases that a portion of the material will pass quickly to the outgoing product stream, thereby contaminating the product with inadequately refined glass.

In the aforesaid U.S. patent application Ser. No. 914,228, an arrangement is proposed whereby glass batch material or the like is liquefied and refined in discrete, physically separated stages, but instead of passing the liquefied material directly to the refining stage, it passes through an intermediate stage where it is readied for entry into the refiner. By providing an intermediate receiving vessel, the stratified foam layer can be contained separately from the refiner, the temperature of the material can be increased so as to be more compatible with the desired convection flow patterns in the refiner, and undissolved sand grains and the like may be provided with sufficient residence time to substantially completely dissolve before entering the refiner.

A preferred embodiment for effecting the intermediate processing of liquefied material being fed to the refiner is an elongated, narrow channel. Typically, the channel has length and width considerably less than that of the refiner. Advantageously, a plurality of liquefying stages may feed a single refiner, in which case each is preferably provided with a channel connecting it with the refiner. Since the primary function of the channel is to permit the liquefied material to be heated to a higher temperature, substantial volume in the channel is not necessary.

The use of a relatively compact channel as the intermediate stage has advantages but also is accompanied by problems. One problem is that the foamy, low density, partially melted material can be difficult to retain in the small vessel. Even when a surface barrier is employed, the short distances involved in the vessel sometimes permit the low density material to be drawn into the stream flowing to the refiner. The small volume also results in relatively short residence time for the material in the channel, thereby making it desirable to accelerate the heating of the material and melting of undissolved solids before the material passes to the refiner. It would also be desirable to achieve some degree of homogenization of the melt in the intermediate stage.

Impingement of combustion gas onto a body of molten glass in order to agitate the glass is disclosed in U.S. Pat. Nos. 3,617,234 (Hawkins et al.), 3,771,988 (Starr), and 3,746,527 (Knavish et al.). In each of these patents the location of the impingement is downstream from the zone of melting and fining, in a region where the glass is being permitted to cool to a forming temperature. Accordingly, these arrangements are not intended to significantly heat the glass and are not involved with restraining unmelted material.

U.S. Pat. No. 3,592,623 (Shepherd) discloses the use of a high velocity stream of combustion gases to restrain unmelted batch material at the melting end of a regenerative furnace. Heat transfer is minimized by avoiding luminous flames. Agitation of the molten material is not disclosed, and the burner orientation does not appear to be adapted to provide significant agitation.

U.S. Pat. No. 3,885,945 (Rees et al.) calls for localized combustion heating of a portion of an electric melter so as to maintain an area of the melt free of foam so as to permit escape of bubbles. A relatively moderate temperature of 2000° F. is disclosed as being suitable for that purpose. No disclosure of agitating the melt is made, and the disclosed burner orientations are not adapted to produce agitation. The combustion products are disclosed as being directed over the unmelted material in the unmelted material in the furnace for the purpose of heating the material, but there is no suggestion that sufficient velocities are involved to restrain the unmelted material from entering the outlet end of the furnace.

SUMMARY OF THE INVENTION

The present invention relates to improvements in the heating and mass flow control in an intermediate stage between liquefying and refining of glass or the like. The invention is a burner arrangement that improves the function of the intermediate stage to increase the temperature of the liquefied material, to subtantially complete dissolution of solid particles, and to isolate the refining process from the low density, foamy material entering the intermediate stage from the liquefying stage. To heat the material within the relatively small space of the intermediate vessel, the burner of the invention directs high temperature flames at close range onto the surface of the partially melted material held in the vessel. The velocity of the flames is sufficient to deform the molten surface and to agitate the melt, thereby enhancing the melting rate. The burner is preferably located just upstream from the discharge end of the intermediate vessel, and the flames may be directed at an angle toward the upstream end of the vessel where the liquefied material is introduced. The burners thus angled serve to retain the floating low density material away from the discharge end so as to not be carried into the refining vessel. The angled impingement also tends to induce an upstream flow in the surface portion of the molten material which also retards entrainment of the surface material into the flow leading to the refiner. With the preferred practice of withdrawing material from the lower portions of the inetrmediate vessel through a passage under a submerged barrier, placement of the burner above the location of withdrawal is also helpful in countering descending flow of cooler material from the upper portion.

The preferred embodiment of the invention comprises a plurality of burner nozzles carried on a water cooled module extending transversely across the intermediate vessel. The large number of flames (e.g., ten to twenty) in a row in that arrangement presents an almost continuous resistance to surface flow across substantially the entire width of the vessel. It is also preferred to supply the burners with oxygen to permit a greater range of firing temperatures.

THE DRAWINGS

FIG. 1 is a top view in cross-section of a preferred embodiment of the present invention showing a pair of channels feeding a refiner.

FIG. 2 is a cross-sectional side view of the embodiment of FIG. 1, taken along line 2—2 in FIG. 1.

FIG. 3 is a transverse cross-sectional view of the same preferred embodiment, taken along line 3—3 in FIG. 1, showing a preferred type of liquefier associated with one of the channels.

FIG. 4 is a detailed view, partly elevational and partly cross-sectional, of a preferred embodiment of burner that may be employed in the present invention.

FIG. 5 is a transverse cross-sectional view of the preferred burner embodiment taken alone line 5—5 in FIG. 4.

FIG. 6 is a fragmentary bottom view showing burner nozzle details of the preferred burner embodiment taken along lines 6—6 in FIG. 4.

FIG. 7 is an end view showing fluid connection details of the preferred burner embodiment taken along line 7—7 in FIG. 4.

FIG. 8 is an enlarged view of a portion of the channel of FIG. 3, showing the action of the burner of the present invention on the molten material.

DETAILED DESCRIPTION

Referring to FIGS. 1 and 2, there is shown a refiner 10 and a conditioner 11 joined by a narrowed waist section 12, all of which are fabricated of conventional refractory ceramic materials normally used for glass melting furnace applications. The refiner 10, conditioner 11, and waist 12 are configured much like a conventional glass melting furnace but with substantially smaller dimensions and with less provision for heating. The refiner is preferably provided with some heating means to bring the molten material 13 to its peak temperature and to help establish the desired circulation patterns within the refiner. To this end, the embodiment depicted is provided with electrodes 14 for passing electric current through the melt so as to resistively heat the melt. A variety of electrode patterns could be employed, the preferred arrangement as illustrated having two groups of double, transverse rows. Combustion burners 15 may also be provided if additional heating capacity is required. Because a substantial portion of the overall energy requirement is provided in the liquifying stage, the heating requirements for the refiner of the present invention are substantially less than for a conventional tank type melting and refining furnace.

As shown in FIG. 1, a pair of channels 20 and 21 lead into the refiner 10 through openings 22 and 23, respectively, in side walls of the refiner. In the arrangement shown, a pair of channels is included, but it should be understood that a larger or smaller number of channels could be provided and that all of the channels need not be in use at any given time. Thus, the system is capable of major incremental changes in throughput. Each channel receives at least partially molten material from a respective liquefying vessel 25, 26. The liquefying stage could assume various configurations as are known in the art, but a particularly advantageous embodiment is that shown in the aforementioned U. S. Pat. No. 4,381,934, wherein a layer of batch material acts as insulation within a rotating vessel and additional batch fed onto the insulating layer is quickly liquefied by intense heat and immediately flows through a bottom opening.

A schematic representation of the preferred liquefying vessel is shown in FIG. 3. The vessel 25 includes a steel drum 30 supported on a circular ring 31, which in turn is mounted for rotation about a vertical axis. A stationary lid 32 may be fitted with a plurality of burners, preferably fired with oxygen, or other heat sources (not shown), and the lid may have an opening (not shown) through which batch materials may be fed into the vessel 25. Additional details of the liquefying process may be found in U. S. Pat. No. 4,381,934.

When glass batch material is liquefied by the preferred embodiment, the liquefied material entering the channel 20 is only partially melted, consisting of a substantial liquid phase including chiefly the soda source material such as soda ash, and a minor solid phase principally including sand grains. The partially melted material at this stage also includes a substantial gas phase consisting mostly of carbon dioxide from decomposition of carbonate mineral batch ingredients. As a result, a foamy layer 33 is usually present on the surface of the material in the channel. Also, as it exits the liquefying vessel, a typical soda-lime-silica glass melt is about 500 to 800 degrees Fahrenheit (270 to 450 degrees Celsius) below the desired peak temperature for refining.

Depending upon the type and quality of glass being produced, the liquefied material received in the channel 30 has had imparted to it a major portion of the total energy requirement for melting and refining. Accordingly, only relatively minor additional amounts of energy need be imparted to the melt, and it has been found advantageous to supply a substantial portion of that energy in the channels before the melt enters the convection refiner. Some of the refining functions, e.g., completing dissolution of sand grains and expelling gases from the melt, may take place in the channels, but the primary function performed in the channels is to increase the temperature of the melt. The temperature is raised in general to about midway between the temperature at which the material enters the channels and the peak refining temperature. By way of example, a glass refined at 2800° F. (1540° C.) is advantageously heated in the channels to about 2300° F. (1260° C.) to 2500° F. (1370° C.). The determining factor in selecting the channel exit temperature is the resulting interaction of the material from the channels on the circulation pattern within the refiner 10, as will be discussed hereinbelow. Heating within the channels may be provided by electrodes 35 as in the embodiment shown in the drawings.

In accordance with the present invention, means for providing combustion heating to the channels may be embodied as an elongated burner 34 having a plurality of burner orifices as shown in FIG. 3. This arrangement not only serves to heat the liquefied material, but also, when the burner flames are angled in an upstream direction, serves to retain the foam layer 33 at the upstream end of the channel, thereby lessening the chances for portions of the foam to be passed into the refiner. The burner 34 will be described in greater detail hereinbelow.

Residence time of the melt in the channels need be only sufficient to accomplish the heating function. Thus, each channel is considerably smaller in volume than the refiner, and the channels are preferably narrow in configuration to provide proximity of the melt to the heat sources and to minimize heat loses. Because of the relatively small size of the channel, the foam layer 33 is a short distance from the exit from the channel, and it has been found to be advantageous to provide means to block passage of the foam into the refiner. As mentioned above, the burner 34 may serve this purpose. A more positive restraint for the foam is a barrier 37 deeply submerged in the material in the channel so that only the most dense material from the lowermost portions of the channel pass under the barrier and through the exit from the channel. The barrier 37 may consist of an assemblage of conduits through which coolant (e.g., water) is passed and may project above the level of the liquefied material so that no material passes over the barrier. The submerged portions of the barrier 37 may include graphite sections so as to reduce the cooled surface area. A bubbler 38 may be utilized close to the upstream side of the barrier to counteract downward currents of glass caused by the coolig effect of the barrier 37. Such a downward current could detrimentally draw the less dense surface material into the stream flowing under the barrier 37. The bubbler may comprise a water-cooled tube through which a gas such as air or nitrogen is injected into the molten material. The injected gas bubbles rise, causing an upward entrainment of the molten material in the region above the bubbler. A raised sill portion 36 may be provided at the entrance of each channel onto the refiner in order to direct the material into the upper elevations of the molten material in the refiner. Optionally, the effective elevation of the sill 36 can be varied by means of an insert 39 that may rest on or near the sill. The insert may be a water-cooled pipe or preferably a graphite rod. A preferred channel exit temperature when processing soda-lime-silica glass may be about 200° F. to 500° F. (110° C. to 28020 C.) below the peak refining temperature.

An optional feature shown in FIG. 2 is a feed tube 46 extending into the refiner 10 through the back wall 41. Cullet may be introduced into the refiner through the feed tube 46.

In the conditioner 11 (FIGS. 1 and 2) the molten material is permitted to cool to a temperature suitable for forming into the desired product such as glass sheets. For soda-lime-silica flat glass the forming temperature is typically in the range of 1900° F. to 2100° F. (1040° C. to 1150° C.).

A cooler 47 at the waist 12 between the refiner 10 and the conditioner 11 as shown in FIGS. 1 and 2 may be employed to regulate molten glass flow into the conditioner and the return flow from the conditioner to the refiner. The cooler 47 is immersed in the upper, forwardly flowing portion of the molten glass and serves to retard the forward velocity and to decrease the circulation of material into and out of the conditioner. This has the beneficial effect of increasing the residence time of the forwardly flowing stream between the spring zone and the conditioner, an interval during which the glass is generally at or near its peak temperature and is subjected to optimal refining conditions.

The size of a melting furnace is affected by its intended throughput capacity. The resident volume of molten material in a conventional flat glass melting and refining furnace (including the conditioner section) is typically on the order of two to three times the daily (24 hours) throughput volume of glass. It is an indication of its efficiency that with the arrangement of the present invention the resident volume of molten glass in the refiner 10 and conditioner 11 may be less than two times the daily throughput, preferably less than 1.5 times, and a particular embodiment has been designed with the resident volume approximately equal to the intended maximum daily throughput.

Details of the construction of a preferred embodiment for the burner 34 are shown in FIGS. 4 through 7. As shown in FIG. 4, the burner 34 may be provided with a stepped shape if it is desired to locate the burner nozzles close to the surface of the material contained in the channel, but such a feature is not essential. The burner depicted in the drawings has the preferred configuration of a linear row of relatively small, closely spaced burner nozzles 50 adapted to extend substantially across the width of the channel so as to present a "curtain" of flame that acts as a barrier to passage of low density material floating on the surface. It should be apparent that other nozzle arrangements that achieve the same effect may be feasible and would be suitable for use in the present invention. For example, more than one row of nozzles may be provided, or the row need not be strictly linear. To maximize the durability of the burner in the harsh environment to which it is subjected, it is preferred to fabricate the burner 34 from stainless steel and to cool the burner by forced circulation of cooling fluid, preferably water. In order to produce high velocity flames, it is preferred to supply pressurized oxidant gas as well as fuel to each burner nozzle. The oxidant gas may be air, but is preferably substantially pure oxygen in order to permit operating at high flame temperatures. The use of air enriched with substantially larger amounts of oxygen than naturally occurring is also contemplated.

The embodiment of the burner 34 depicted in the drawings accommodates the preferred operational features by providing separate passageways for fuel, oxidant, incoming coolant, and outgoing coolant. the passageways could be constructed in a variety of ways, such as a group of tubular conduits, but a specific preferred construction involves welded square or rectangular conduits as shown in FIGS. 4 and 5. In that example a fuel conduit 51, oxidant conduit 52, and incoming coolant conduit 53 are clustered in the center of the burner. An outer casing 54 surrounds the inner conduits in spaced relationship so as to form an annular passage 55 through which the return flow of coolant may pass. The distal end 56 of coolant conduit 53 is open so that coolant may pass therefrom into annular passage 55. The nozzles 50 may be comprised of short tubular pieces extending through the outer casing 54 and the annular passage 55 into communication with the fuel and oxidant conduits. Slots 57 and 58 open the fuel and oxidant conduits respectively to the interior of each nozzle 50 as shown in FIG. 6 in particular. Fluid connections to the burner conduits may be arranged at the end portion of the burner disposed outside of the heated space as shown in FIG. 7. Conduit 60 connects conduit 51 to a supply of fuel such as natural gas (methane). Conduit 61 connects conduit 52 with a supply of oxidant such as oxygen. Coolant such as water may enter conduit 62 to conduit 53 and return through passage 55 to drain through conduit 63. The coolant could take the reverse flow path if desired.

Referring now to FIG. 8, the burner 34 is operated with sufficient flame velocity to deform the surface of the molten material 70 held in the channel 20. The velocity is controlled by the pressure of the fuel and oxidant supplied to the burner and is also determined by the size of the openings 57 and 58 (FIGS. 5 and 6). The velocity desired for a particular application will depend upon the distance between the burner and the molten surface, the viscosity of the molten material, and the degree of deformation required. In general, greater deformation is preferred for the sake of a greater homogenization effect, but the flame velocity should not be so great as to cause frothing or splattering of the molten material. Minimizing the distance between the burner and the molten surface is preferred for the sake of intensifying the temperature of the flames impinging the molten material. For the particular operating conditions disclosed here, it is preferred to space the burner no farther than 25 centimeters from the surface of the melt. By way of example sufficient agitation of the surface has been found to be achieved by the flame produced at each burner nozzle when supplying natural gas to an orifice 0.024 square inches in area at 6 to 8 pounds per square inch and 200 standard cubic feet per hour, and oxygen to an orifice 0.039 square inches in area at 10 to 12 pounds per square inch in an amount to complete combustion. The nozzle in that example was about 18 to 20 centimeters from the surface of the melt. It is preferred that the burner be mounted at an angle $\theta$ so that the flames 71 impinge obliquely on the molten surface away from the outlet end of the channel. This not only restrains movement of the floating material 33 toward the outlet, but also impels surface portions of the molten material to flow in a direction upstream from the outlet end. The angle $\theta$ is preferably in the range of 5° to 20° from vertical, most preferably 10° to 15°. Larger angles from vertical may be used for a greater foam retention effect, but the homogenization effect may be lessened.

It should be apparent that a plurality of burners could be used in the present invention, with each extending part of the way across the channel or with each extending the full width to act in series. It should also be apparent that the orientation the burner of the present invention need not be strictly perpendicular to the channel sides, but may be angled somewhat.

Other variations and modifications as would be obvious to those of skill in the art may be resorted to within the scope of the invention as defined by the claims that follow.

We claim:

1. A method of making glass comprising:
   liquefying glass batch materials and transferring the liquefied material to an entrance end of an elongated channel;
   heating the material in the channel to raise the temperature of the material;
   passing the heated material from a discharge end of the channel to a refining vessel; and
   impinging a transversely extending curtain of flames onto the surface of the material in the channel at a region between the entrance end and the discharge end with sufficient force to deform the surface of the material and to induce circulation of the material and to raise the temperature of the material.

2. The method of claim 1 wherein the flames are impinged on the surface of the melt at an oblique angle directed away from the outlet end of the channel.

3. The method of claim 2 wherein the flames are impinged at an angle of 5° to 20°.

4. The method of claim 2 wherein the flames are impinged at an angle of 10° to 15°.

5. The method of claim 1 wherein the curtain of flames extending transversely across the channel impinges on the surface of the material in the channel closely adjacent to the discharge end of the channel.

6. The method of claim 1 wherein the flames are supplied with an oxidant having a higher concentration of oxygen than naturally occurring in air.

7. The method of claim 6 wherein the oxidant consists essentially of oxygen.

* * * * *